US008325327B2

(12) United States Patent
Rogers et al.

(10) Patent No.: US 8,325,327 B2
(45) Date of Patent: Dec. 4, 2012

(54) USING REMOTELY DETECTED WIND VELOCITIES TO ENHANCE UNDERSTANDING OF AN IMPENDING OR OCCURRING EVENT

(75) Inventors: Philip L. Rogers, Hume, VA (US); Alisa K. Rogers, Hume, VA (US); Elizabeth A. Dakin, Great Falls, VA (US); Christopher D. Bedford, Watertown, MA (US)

(73) Assignee: BlueScout Technologies, Inc., Chantilly, VA (US)

( * ) Notice: Subject to any disclaimer, the term of this patent is extended or adjusted under 35 U.S.C. 154(b) by 52 days.

(21) Appl. No.: 12/815,969

(22) Filed: Jun. 15, 2010

(65) Prior Publication Data

US 2011/0304843 A1 Dec. 15, 2011

(51) Int. Cl.
*G01P 3/36* (2006.01)
(52) U.S. Cl. .............................. 356/27; 356/28; 356/28.5
(58) Field of Classification Search ..................... 356/27, 356/28, 28.5, 3.01–3.15, 4.01–4.1; 340/968, 340/649, 973, 977, 945
See application file for complete search history.

(56) References Cited

U.S. PATENT DOCUMENTS

| 4,168,906 | A | * | 9/1979 | Schwiesow | 356/28 |
|---|---|---|---|---|---|
| 4,589,070 | A | * | 5/1986 | Kyrazis | 701/14 |
| 5,724,125 | A | * | 3/1998 | Ames | 356/28.5 |
| 6,856,396 | B2 | * | 2/2005 | McGuire | 356/450 |
| 7,391,506 | B2 | * | 6/2008 | Harris et al. | 356/28.5 |
| 7,427,157 | B2 | * | 9/2008 | O'Neill et al. | 374/102 |
| 7,557,735 | B1 | * | 7/2009 | Woodell et al. | 340/968 |
| 7,777,866 | B1 | * | 8/2010 | Kyrazis | 356/28.5 |
| 7,898,435 | B2 | * | 3/2011 | Rogers et al. | 340/973 |
| 7,934,905 | B2 | * | 5/2011 | Eggleston | 416/61 |
| 7,982,862 | B2 | * | 7/2011 | Hite et al. | 356/28 |

FOREIGN PATENT DOCUMENTS

WO  WO 2009/134221 A1  11/2009

\* cited by examiner

*Primary Examiner* — Sang Nguyen
(74) *Attorney, Agent, or Firm* — Knobbe Martens Olson & Bear LLP

(57) ABSTRACT

Methods and systems for using laser Doppler velocimeters to determine and use wind velocities at the locations of impending and occurring events such as sports events are presented. Laser Doppler velocimeters are used to determine wind velocities where an event is occurring or an impending event is about to occur. The determined wind velocities are used to generate and display a representation of the impending or occurring event that accounts for the effect of the determined wind velocities on the impending or occurring event.

20 Claims, 9 Drawing Sheets

USING REMOTELY DETECTED WIND VELOCITIES TO ENHANCE UNDERSTANDING OF AN IMPENDING OR OCCURRING EVENT

BACKGROUND

The disclosure relates to using a remote wind velocity sensor and in particular to using wind velocities measured by the remote wind velocity sensor to visually enhance understanding of an impending or occurring event.

Wind velocity measurements are used in a variety of circumstances. For example, much work has focused on the use of measured wind velocities in the aerospace and aviation industries. As another example, knowledge of wind velocities is vital for the efficient operation of wind energy installations. Measured wind velocities have also been used for decades to predict weather patterns and to aid in forecasting.

Historically, wind measurements have been provided by on-site wind velocity sensors. Anemometers, both on-ground or mounted on an above-ground platform (such as a weather balloon or tower), have for decades been the predominant wind velocity sensor. Such on-site sensors, for example, have been used to generate weather maps showing wind velocities at various locations on the map. The wind velocities measured at the location of each device are added to a single map so that the map shows a collection of wind velocities from which patterns can be visualized. On-site wind velocity measurements are used for a variety of other applications as well.

In recent years, remote wind velocity sensing has been employed. In remote wind velocity sensing, an instrument is configured to measure wind velocities at locations remote from the location of the instrument. Typically, remote wind velocity sensors project a measurable form of energy to the desired measurement location. At least a portion of the projected energy is reflected back to the wind velocity sensor which then determines from the reflected portion of energy the characteristics of the measured wind. Projected energy includes both acoustic energy and electromagnetic energy.

An example of a remote wind velocity sensor is a laser Doppler velocimeter ("LDV"). A wind speed LDV transmits light to a target region (e.g., into the atmosphere) and receives a portion of that light after it has scattered or reflected from the target region or scatterers in the target region. In atmospheric measurements, the target for this reflection consists of entrained aerosols (resulting in Mie scattering) or the air molecules themselves (resulting in Rayleigh scattering). Using the received portion of scattered or reflected light, the LDV determines the velocity of the target relative to the LDV.

In greater detail, a wind speed LDV includes a source of coherent light, a beam shaper and one or more telescopes. The telescopes each project a generated beam of light into the target region. The beams strike airborne scatterers (or air molecules) in the target region, resulting in one or more back-reflected or backscattered beams. In a monostatic configuration, a portion of the backscattered beams is collected by the same telescopes which transmitted the beams. The received beams are combined with reference beams in order to detect a Doppler frequency shift from which velocity may be determined.

With the advent of the LDV, remote wind velocity sensing may be performed in environments where wind velocity measurements were desirable but not before possible in any practical sense. For example, the outcome of many sports competitions (e.g., American football, baseball, golf, etc.) may be influenced by wind velocities. Consequently, knowledge of wind conditions at such sporting events is desirable, even if the wind velocity information is only known by spectators (in certain sports, rules of competition may prohibit the competitors from using devices that indicate the precise wind velocity). By knowing the precise wind velocity at the competition venue, individuals would be better able to determine the specific actions or counter-measures that should be taken during the competition to account for the measured wind velocity.

BRIEF SUMMARY OF THE DISCLOSED EMBODIMENTS

An LDV is used to remotely determine wind velocities in situations where on-site wind velocity sensors are not practical. For example, in an American football game when a kicker kicks an extra point or a field goal, the path that the football takes after being kicked is influenced by the wind velocity in the football stadium. Specifically, the path of the kicked football is influenced by wind velocity at the location of the kicker, at the height and location of the goalposts and at the intervening heights and locations. While measuring wind velocities using on-site wind velocity sensors at the location of the kicker and the location and height of the goalposts is at least inconvenient, using on-site wind velocity sensors to measure wind velocities at intervening locations and height is clearly impractical for many reasons, including the probable obstruction of the game. Remote wind velocity sensors such as an LDV are necessary in this situation in order to identify wind velocities not only at the location of the kicker and at the location and height of the goalposts, but also at intervening locations and heights.

As another example, a ball hit by a baseball player seeking to hit a homerun is also influenced by the wind velocity in the stadium. Wind may affect both the direction of the ball's flight and the distance it travels. The use of on-site wind velocity sensors on or above the playing field would likely obstruct play. The game of golf provides yet another example. While the path of a golf ball in the air is naturally influenced by wind velocities along the path, the use of on-site wind velocity sensors above the fairway is clearly not desirable. Other examples may be considered.

In each of the above-described examples, knowledge of the wind velocity along the path of the ball helps to educate both the players and spectators of how the ball must be kicked or hit. Indeed, golfers may often be seen testing the wind by releasing a few blades of grass and by observing the behavior of the flag on the green before teeing-up to swing. However, in each of the examples, the use of on-site wind velocity sensors along the path of the ball is impractical. Remote wind velocity sensors must be used.

According to an embodiment of the invention, remote wind velocity sensors such as an LDV are used to measure the wind velocity in the air space above a playing field just before or during the occurrence of a field event. The determined wind velocities are then used to visualize on a screen the desired "apparent" path of the ball during the event. Thus, for a field goal or extra point in American football, the screen indicates the view of the goalposts after compensation for the measured wind velocities has been applied. In baseball, the screen indicates the compensated distance of the outfield wall over which a homerun ball must be hit. In golf, the screen indicates a wind-compensated view of the fairway.

DETAILED DESCRIPTION OF THE DISCLOSED EMBODIMENTS

An LDV is used to remotely determine wind velocities in situations where on-site wind velocity sensors are not practical. An example of a preferred LDV wind velocity sensor is disclosed in International Application Publication No. WO/2009/134221 ("the '221 publication"), the entirety of which is incorporated herein by reference. The LDV of the '221 application includes a plurality of transceiver telescopes that are remotely located from the LDV coherent light source.

The LDV disclosed in the '221 application includes an active lasing medium, such as e.g., an erbium-doped glass fiber amplifier for generating and amplifying a beam of coherent optical energy and a remote optical system coupled to the beam for directing the beam a predetermined distance to a scatterer of radiant energy. The remote optical system includes "n" duplicate transceivers (where n is an integer that may be, for example, one, two or three) for simultaneously measuring n components of velocity along n noncolinear axes.

Also as disclosed in the '221 application, the optical fiber is used to both generate and wave guide the to-be-transmitted laser beam. A seed laser from the source is amplified and, if desired, pulsed and frequency offset, and then split into n source beams. The n source beams are each delivered to an amplifier assembly that is located within the n transceiver modules, where each of the n transceiver modules also includes a telescope. Amplification of the n source beams occurs at the transceiver modules, just before the n beams are transmitted through the telescope lens to one or more target regions. When the n source beams are conveyed through connecting fibers from the laser source to each of the n telescopes within the respective transceiver modules, the power of each of the n source beams is low enough so as not to introduce non-linear behaviors from the optical fibers. Instead, power amplification occurs in the transceiver module, just before transmission from the telescope. Consequently, fiber non-linear effects are not introduced into the system.

By using the LDV disclosed in the '221 application, wind velocities may be measured remotely with a high degree of accuracy. Because the source laser is split into n beams, the measurements taken along all of the n axes are simultaneous. Additionally, splitting the source beam into n beams does not necessarily require that the source laser transmit a laser with n times the necessary transmit power, because each of the n beams are subsequently power amplified before transmission. Furthermore, the disclosed LDV has no moving parts, and is thus of reduced size and improved durability. Because of the light-weight and non-bulky nature of the LDV, the LDV of the '221 application is ideal for mounting on small-profile platforms. Additionally, as described in the '221 application, the LDV wind velocity sensor could include a hand-held or portable device.

Figure 1:
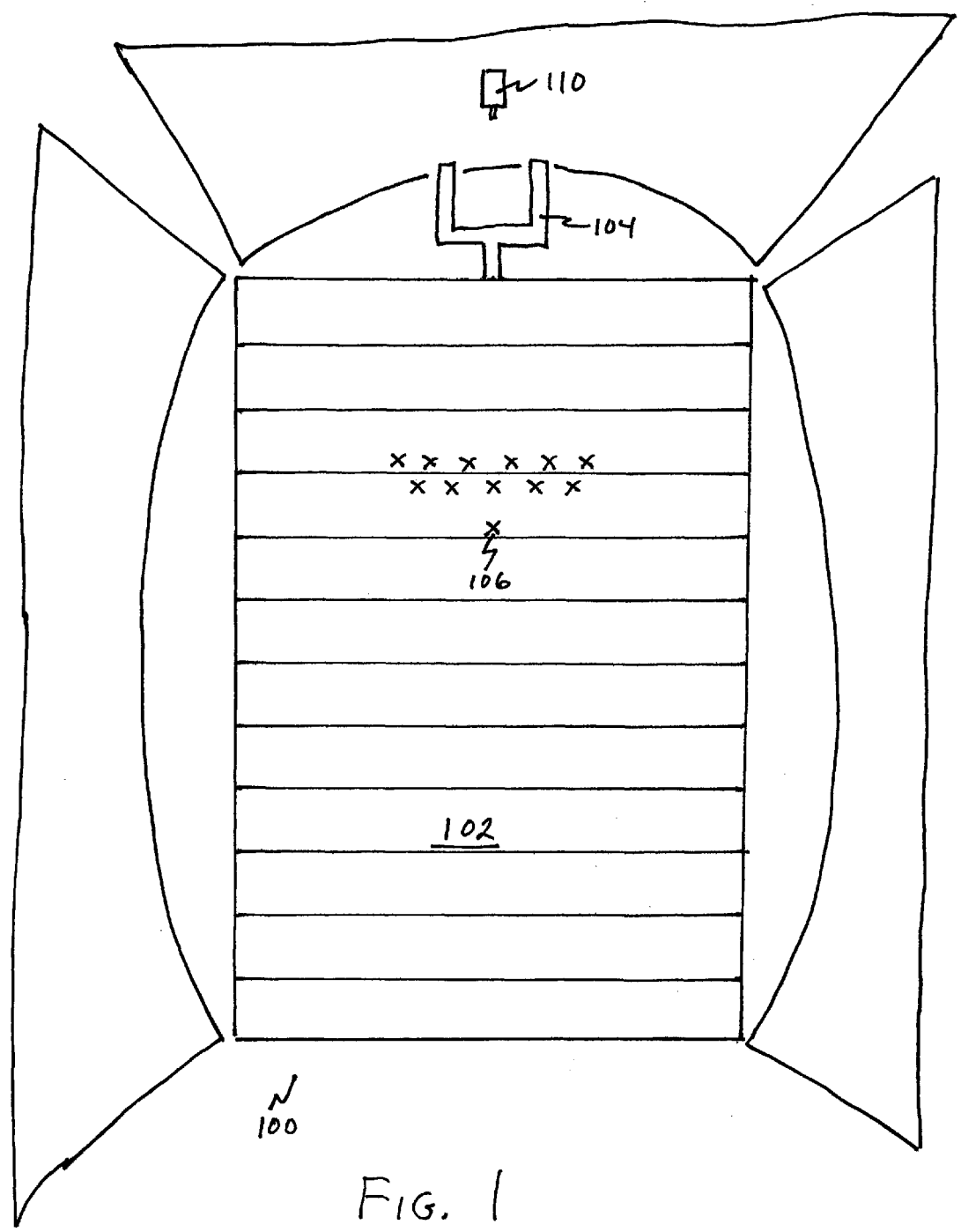
FIG. 1 is a depiction of an American football stadium in accordance with embodiments of the disclosed invention.

According to a disclosed embodiment, remote wind velocity sensors such as the LDV of the '221 application are used to measure the wind velocity in the air space above a playing field just before or during the occurrence of a field event. As an example, FIG. 1 depicts a football stadium 100 with a playing field 102 and goalposts 104. Players on the playing field 102 are indicated by Xs. A kicker 106 desires to kick a football through the goalposts 104 (to score either a field goal or an extra point). In order to inform players and spectators of the wind velocities that may affect the kicked football, an LDV wind velocity sensor 110 is mounted in the stadium. Alternatively, the LDV wind velocity sensor 110 could be portable and held by a person in the stadium. The LDV wind velocity sensor 110 is directed towards the space for which wind velocity information is required. The LDV wind velocity sensor 110 is then set to measure the wind velocities at specific distances from the LDV wind velocity sensor 110 in the aimed direction, the specific distances corresponding to the locations in the space for which wind velocity information is desired. While FIG. 1 illustrates the LDV wind velocity sensor 110 at a location behind the goalposts 104, the LDV wind velocity sensor 110 could be located at various places throughout the stadium 100 as long as the LDV wind velocity sensor 110 has a line-of-sight with the spaces to be measured.

Figure 2:
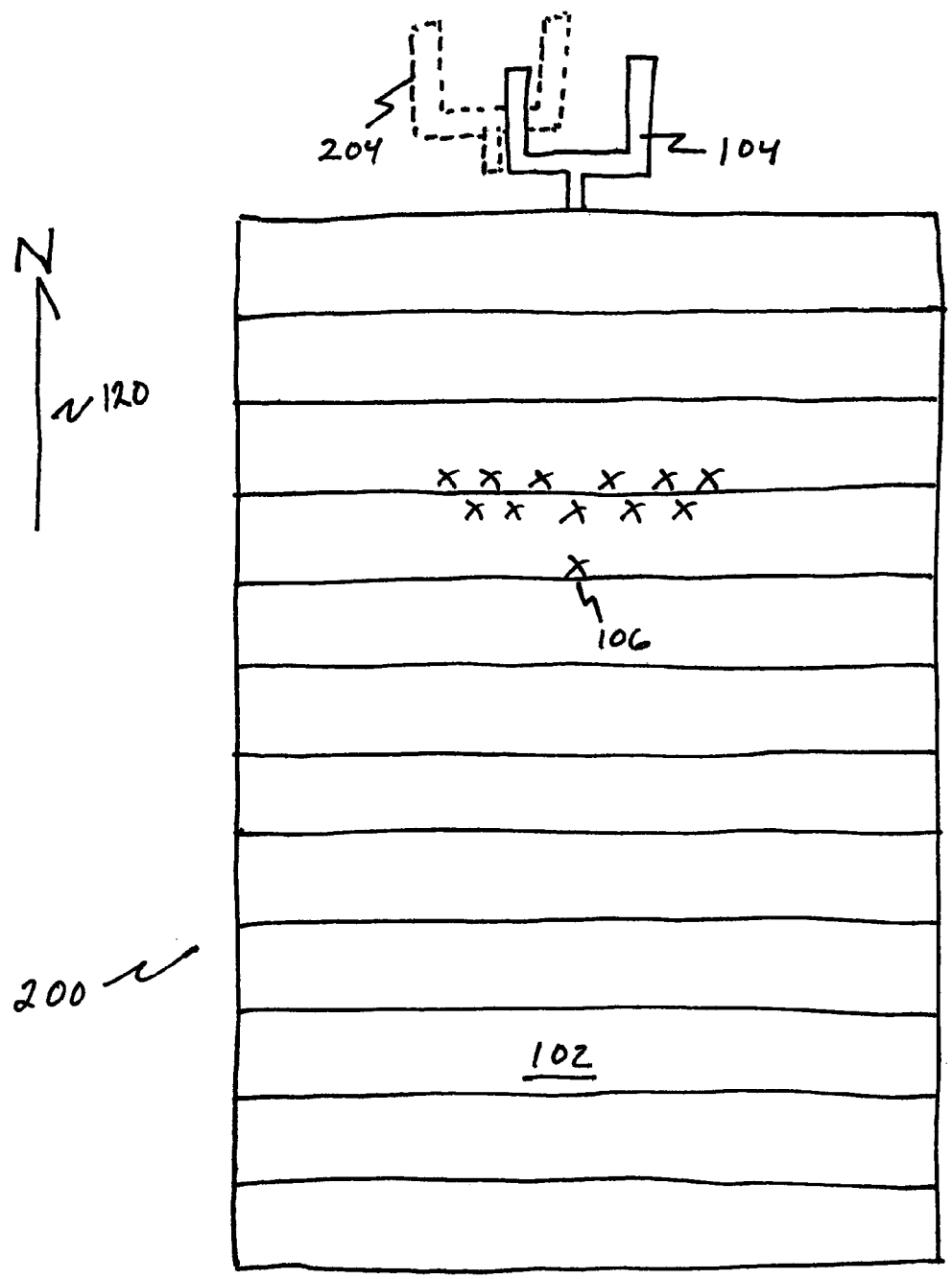
FIG. 2 is a depiction of a wind-compensated representation of a football playing field in accordance with embodiments of the disclosed invention.

Once wind velocity measurements are obtained, a wind-compensated view of the goalposts 104 can be visualized on a screen. In FIG. 2, a visualization 200 of the football playing field 102 is illustrated. The visualization 200 includes the playing field 102, the actual location of the goalposts 104, and the players as Xs with the kicker 106. The visualization 200 also includes a wind-compensated representation of the location of the goalposts 204. The wind-compensated goalposts 204 are displayed at a location that represents the apparent direction and distance of the goalposts 204 from the kicker 106 after accounting for the measured wind velocity. In FIG. 2, the wind-compensated goalposts 204 are located behind and to the left of the actual goalposts 104, indicating that the wind in the measured portion of the stadium 100 includes components blowing from the northwest (a compass 120 in the visualization 200 indicates the direction of orientation). In order to kick the football through the actual goalposts 104, the kicker 106 must kick the football as if the goalposts 104 were located where the wind-compensated goalposts 204 are located.

Alternative visualizations may be used. As an example, visualization 200 could indicate the expected path of the football if the football is to successfully be kicked through the actual goalposts 104. Wind vectors could be overlaid onto the playing field 102 in order to indicate the direction and strength of the measured wind. The wind-compensated goalposts 204 or projected path of the successfully kicked football could be shown within a range of uncertainty based on, for example, fluctuations in the wind. Other variations exist.

The visualization 200 is made available to interested parties. The visualization 200 may be shown on one or more video monitors or displays in the stadium 100 so that everyone can see the visualization 200. If desired, the visualization can be made available only to non-players (such as spectators and coaches). The visualization 200 could be available to spectators via television, computer or mobile device. The visualization 200 may be presented as a small picture within a larger picture of the game (e.g., picture-in-picture), as a computer-generated graphic, or as a graphic overlay onto the main viewing picture (wherein graphic representations of the wind-compensated goalposts 204 or projected path are overlaid onto the actual video footage of the game).

Figure 3:
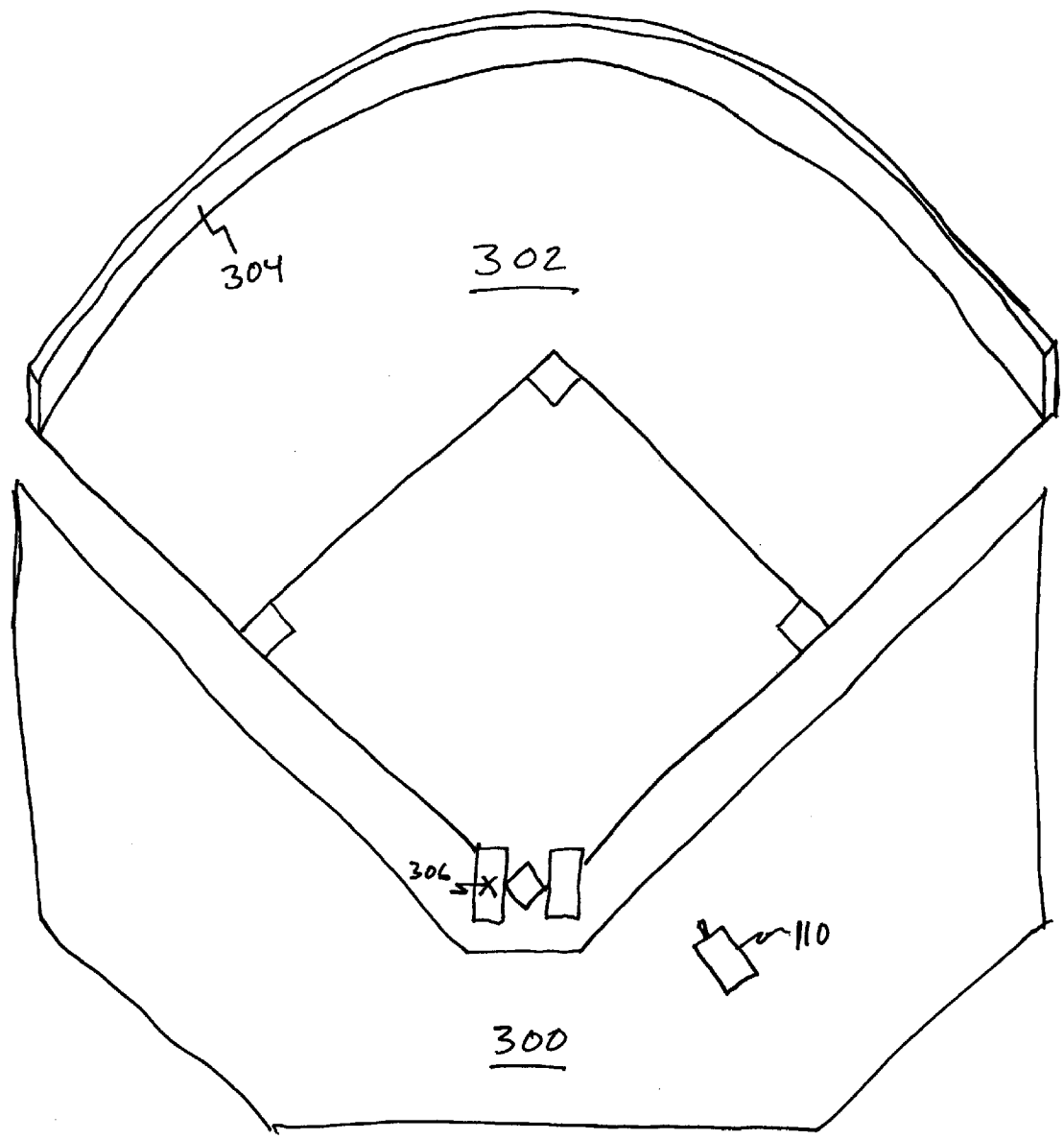
FIG. 3 is a depiction of a baseball stadium in accordance with embodiments of the disclosed invention.

FIG. 3 depicts a baseball stadium 300 that includes a playing field 302, an outfield wall 304 and players X. A player-at-bat 306 may attempt to hit a homerun ball over the outfield wall 304. In order to inform players and spectators of the wind velocities that may affect the potential homerun hit, LDV wind velocity sensor 110 is mounted or hand-held in the stadium 300. The LDV wind velocity sensor 110 is directed towards the space for which wind velocity information is required. The LDV wind velocity sensor 110 is then set to measure the wind velocities at specific distances from the LDV wind velocity sensor 110 in the aimed direction, the specific distances corresponding to the locations in the space for which wind velocity information is desired. The LDV wind velocity sensor 110 could be located at various places throughout the stadium 300 as long as the LDV wind velocity sensor 110 has a line-of-sight with the spaces to be measured.

Figure 4:
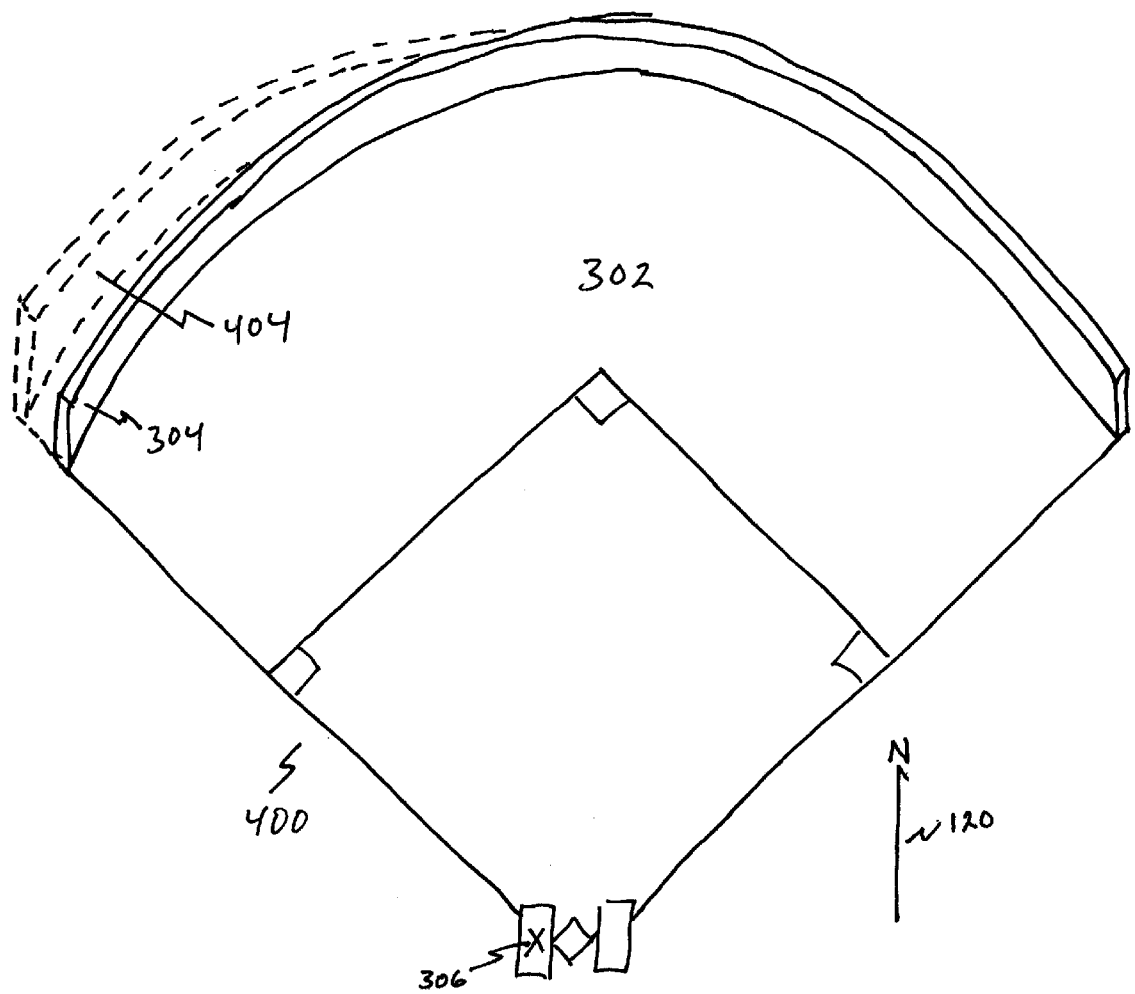
FIG. 4 is a depiction of a wind-compensated representation of a baseball playing field in accordance with embodiments of the disclosed invention.

In FIG. 4, a visualization 400 of the playing field 302 is illustrated. The visualization 400 includes the playing field 302, the actual location of the outfield wall 304, and the players X with the player-at-bat 306. The visualization 400 also includes a wind-compensated representation of the location of the outfield wall 404. The wind-compensated outfield wall 404 is displayed at a location that represents the apparent distance of the outfield wall 404 from the player-at-bat 306 after accounting for the measured wind velocity. In FIG. 4, the wind-compensated outfield wall 404 is located further away from the player-at-bat 306 in the left field of the playing field 302, indicating that the wind includes a component blowing from the northwest (a compass 120 in the visualization 400 indicates the direction of orientation). In order to hit a homerun over the left field portion of the playing field 302, the player-at-bat 306 must hit the ball as if the outfield wall 304 was further away than the distance indicated on the wall 304.

The visualization 400 is displayed to players (if allowed) and spectators using video monitors or displays in the stadium 300, televisions, computers and mobile devices. Alternative methods of displaying the wind velocity measurements or useful information derived from the measurements may be used.

Figure 5:
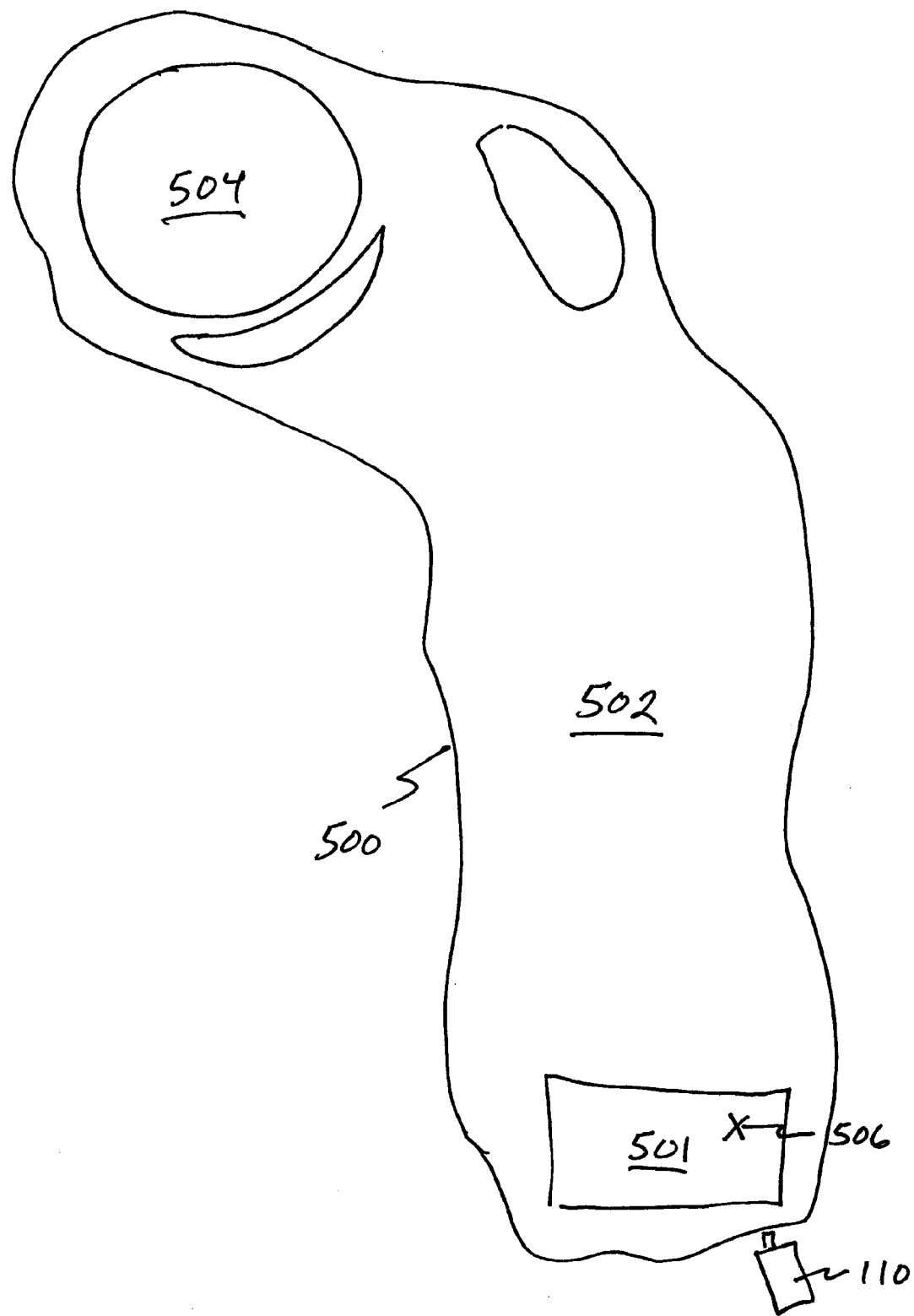
FIG. 5 is a depiction of a golf hole in accordance with embodiments of the disclosed invention.

Referring now to FIG. 5, a hole 500 on a golf course is depicted. The hole 500 includes a teeing area 501, a fairway 502 and a green 504. A player 506 is also depicted as teeing-up on the teeing area 501. The player 506 has in mind where on the fairway 502 or green 504 the ball should be hit. In order to inform the player and/or spectators of the wind velocities that may affect the next golf stroke, the LDV wind velocity sensor 110 is mounted or hand-held near the hole 500. The LDV wind velocity sensor 110 is directed towards the space above the fairway 502 and green 504 for which wind velocity information is required. The LDV wind velocity sensor 110 is then set to measure the wind velocities at specific distances from the LDV wind velocity sensor 110 in the aimed direction, the specific distances corresponding to the locations in the space for which wind velocity information is desired. The LDV wind velocity sensor 110 could be located at various places near the hole 500 and could be a handheld device.

Figure 6:
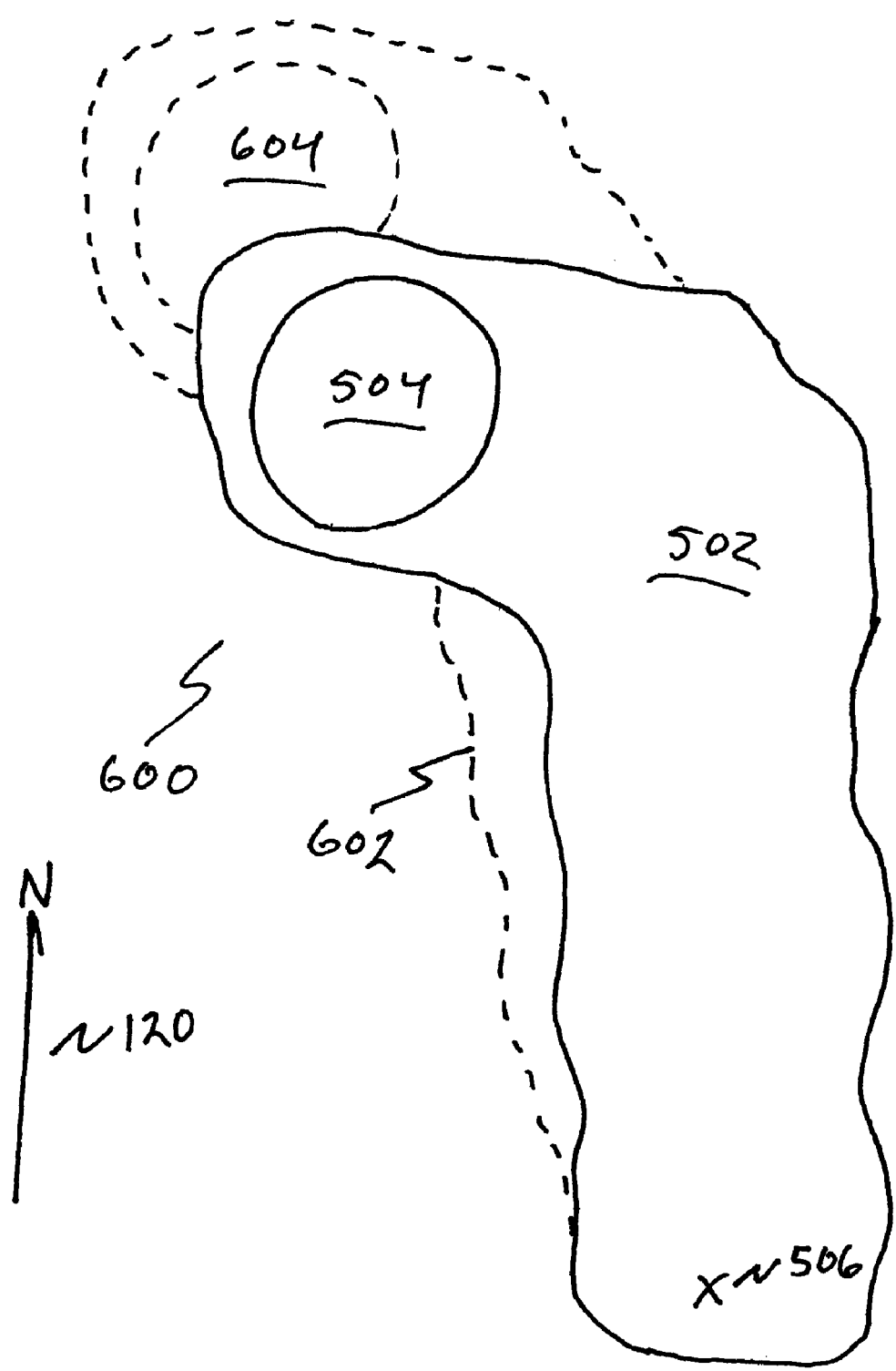
FIG. 6 is a depiction of a wind-compensated representation of a golf hole in accordance with embodiments of the disclosed invention.

In FIG. 6, a visualization 600 of the fairway 502 and green 504 is illustrated. The visualization 600 includes the player 506 and a wind-compensated representation of the location of the fairway 602 and the green 604. The wind-compensated fairway 602 and green 604 are displayed at locations that represent the apparent distance, position and shape of the fairway 602 and green 604 from the perspective of the player 506 after accounting for the measured wind velocity. In FIG. 6, the wind-compensated fairway 602 and green 604 are stretched and shifted to the left of the player 506, indicating that the wind includes a component blowing from the northwest (a compass 120 in the visualization 600 indicates the direction of orientation). In order to hit a golf ball so that it lands at the desired location on the fairway 502 or green 504, the player 506 must hit the ball harder than and to the left of a normal hit.

The visualization 600 is displayed to players (if allowed) and spectators using video monitors or displays near the hole 500, televisions, computers and mobile devices. Alternative methods of displaying the wind velocity measurements or useful information derived from the measurements may be used.

In addition to the football, baseball and golf examples explained above, the use of an LDV wind velocity sensor to remotely measure wind velocities and then display useful results extends to other sporting events as well. For example, other sports where knowledge of wind velocities may be useful include long-distance ski jumping and sailing, just to name a few.

Figure 7:
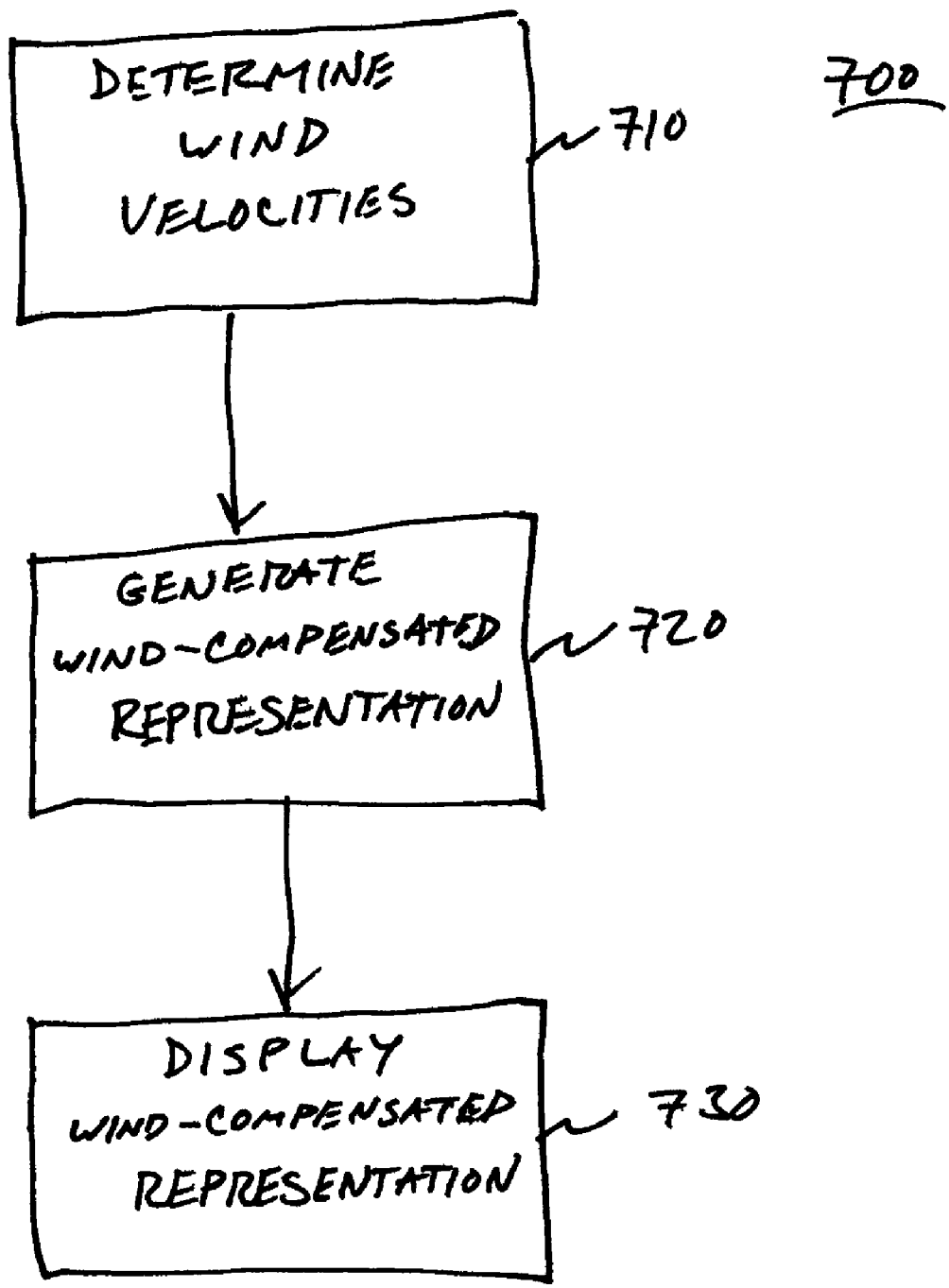
FIG. 7 illustrates a method of measuring and using wind velocity information to enhance understanding of an impending event in accordance with embodiments of the disclosed invention.

FIG. 7 illustrates method 700 which is an example of the methods applied in the above-described embodiments. At step 710, an LDV wind velocity sensor is used to determine wind velocities for an area of space relevant to a wind-dependent event about to occur. The wind-dependent event could include, for example, a field goal or extra point kick in football, a homerun in baseball, the hitting of a golf ball, etc. At step 720, the measured wind velocity is used to generate a visual representation of the event about to occur. The visual representation is a wind-compensated perspective of the event. At step 730, the visual representation is displayed on a screen. The screen could include a screen at the event, a broadcast or cable television screen, an internet feed on a computer, or a screen on a mobile device.

Figure 8:
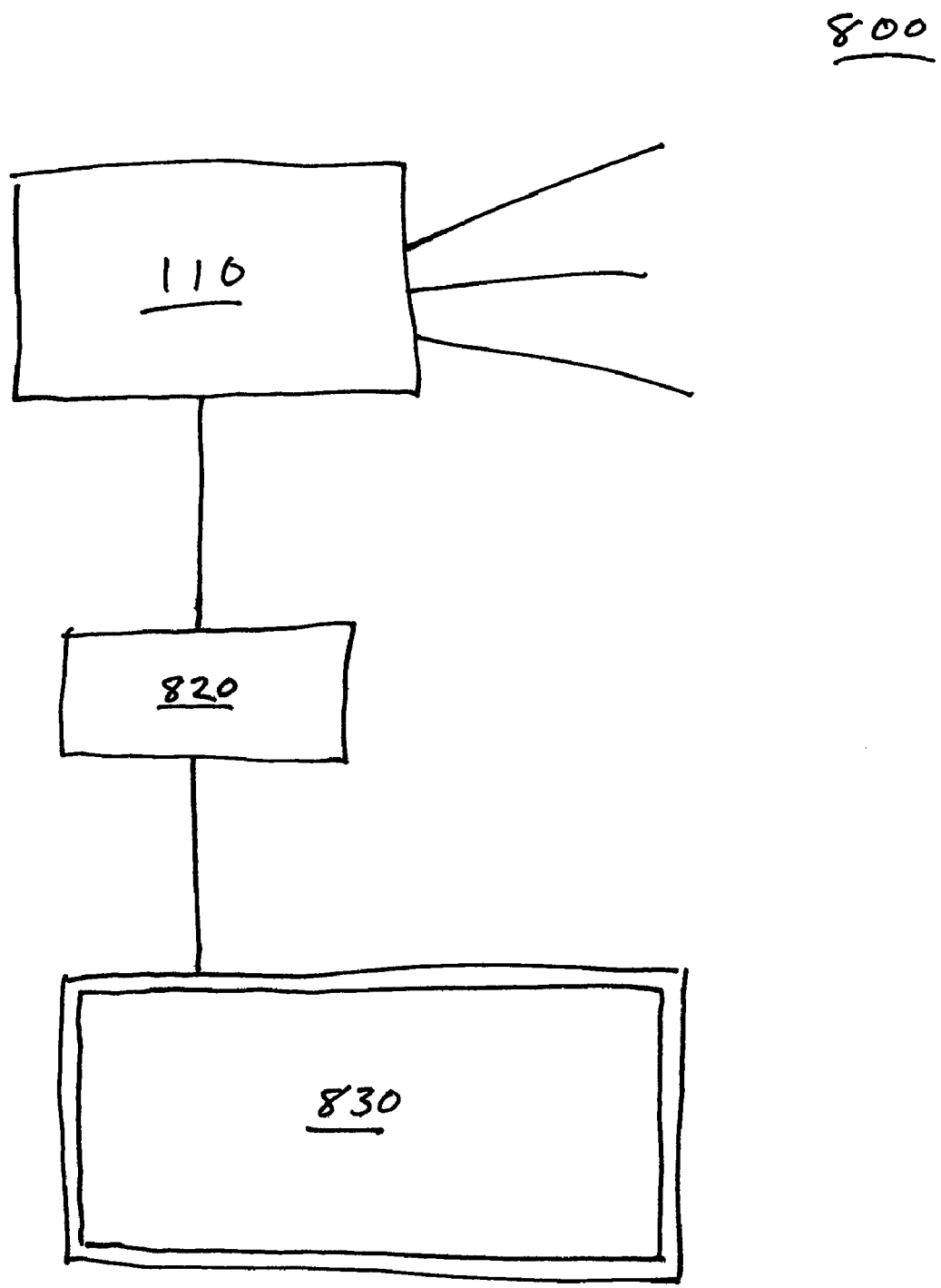
FIG. 8 illustrates a system in accordance with embodiments of the disclosed invention.

FIG. 8 illustrates a basic configuration of a system 800 that implements the method 700 of FIG. 7. System 800 includes an LDV 110 coupled to a processor 820. The processor 820 may be incorporated within the LDV 110 or may be separate, as shown. The LDV 110 determines the wind velocities in the target space and transfers the determined wind velocities to the processor 820. Processor 820 uses the received wind velocity information to generate a wind-compensated visualization of the target area. The wind-compensated visualization is transmitted from the processor 820 to a display 830 in order to enhance player and spectator understanding of the target area.

The visual representation is used to enhance the knowledge of wind conditions just before the anticipated event and to assist in understanding what must be done to compensate for the wind conditions in order for the event to occur successfully. This information is, of course, most useful to the players themselves, where allowed. Even if a player were not allowed to use this information during actual competition, the use of the measured wind velocity information during practice is still very useful. Spectators and commentators also benefit from the measured information and display. Where allowed, the information could be used to influence gaming decisions at casinos and other legalized gambling institutions. The information is also very useful to sports simulations where individuals can "play along" with the professionals (such as in virtual golf or sailing competitions).

Emphasis has been placed on the process of using LDV wind velocity sensors to obtain wind velocity measurements and for using the measurements to display a wind-corrected perspective. The process of generating the wind-corrected perspective may be performed using techniques known in the art. For example, Newton's laws of motion may be used to generate the wind-corrected perspective. However, additional refinements to the generation of the wind-corrected perspective may be implemented as desired.

Figure 9:
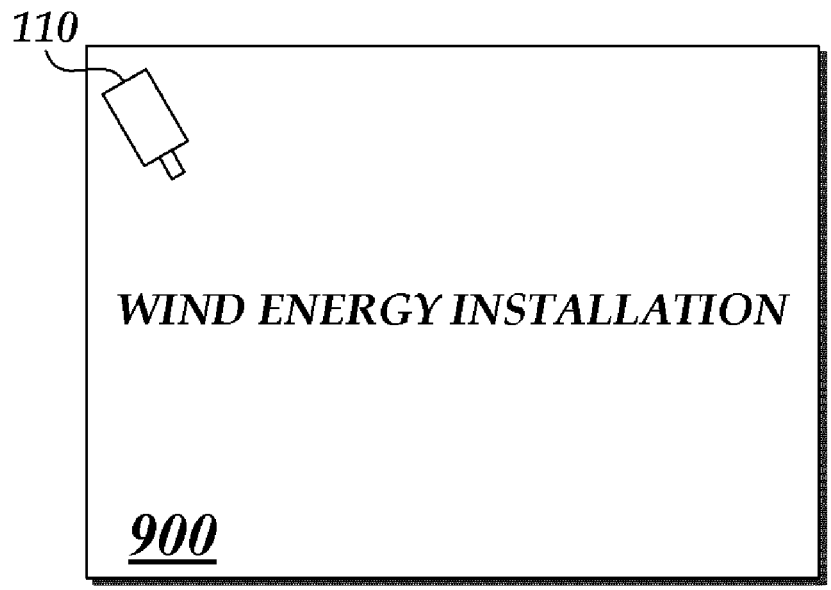
FIG. 9 illustrates a wind energy installation with an LDV.

FIG. 9 is a block diagramming illustrating an embodiment of a wind energy installation 900 with an LDV 110. The LDV 110 is configured to measure wind velocities at locations remote from itself.

The above description and drawings should only be considered illustrative of embodiments that achieve the features and advantages described herein. Modification and substitutions to specific structures can be made. For example, although the embodiments have been described for use with LDVs, other remote wind velocity measurement devices that can remotely determine wind velocity may be used. Accordingly, the claimed invention is not to be considered as being limited by the foregoing description and drawings.

What is claimed as new and desired to be protected by Letters Patent of the United States is:

1. A method comprising:
   measuring wind velocities with a wind velocity sensor above an event surface previous to or during a field event;
   determining with a processor an expected effect of the wind velocities on an object along a desired path relative to a point of interest; and
   displaying an expected wind-compensated representation of the event surface which is distorted related to the event surface based on the expected effect of the wind velocities on the object-along the desired path in relation to the point of interest.

2. The method of claim 1, wherein the wind velocities are measured at intervening heights and locations between a point of origin of the object and the point of interest.

3. The method of claim 1, further comprising:
   locating the wind velocity sensor removed from the field of interest for measuring wind velocities at a plurality of points above the field of interest directly prior or during a field event.

4. The method of claim 3, further comprising using a laser Doppler velocimeter to perform the measuring.

5. The method of claim 4, wherein the event surface is a football field, the object is a football, the point of interest is a goalpost, the field event is kicking the football, and the displaying further comprises displaying a suggested path that the football should travel in order to have a successful outcome to kicking the football.

6. The method of claim 4, wherein the event surface is a baseball field, the object is a baseball, the point of interest is an outfield wall, the field event is hitting the baseball, and the displaying further comprises displaying a suggested path that the baseball should travel in order to have a successful outcome to hitting the baseball.

7. The method of claim 4, wherein the event surface is a golf course, the object is a golf ball, the point of interest is a fairway or green, the field event is hitting the golf ball, and the displaying further comprises displaying a suggested path that the golf ball should travel in order to have a successful outcome to hitting the golf ball.

8. The method of claim 4, wherein the event surface is a wind energy installation.

9. The method of claim 4, further comprising:
   displaying the expected effect on the object of interest along the desired path at the field event such that it is viewable to a participant of the field event.

10. The method of claim 4, further comprising:
    displaying the expected effect on the object of interest along the desired path on a display at the field event, such that it is viewable to an observer of the field event.

11. A system comprising:
    a wind velocity sensor configured to measure wind velocities proximate an event surface with respect to a field event;
    a processor coupled to the wind velocity sensor and configured to compute an expected effect of the wind velocities on an object along a desired path of the object based on the measured wind velocities; and
    a display coupled to the processor and configured to display an expected wind-compensated representation of the event surface which is distorted related to the event surface based on the expected effect of the wind velocities on the object-along the desired path.

12. The system of claim 11, wherein the wind velocities are measured at intervening heights and locations between a point of origin of the object and the point of interest.

13. The system of claim 11, wherein the wind velocity sensor is positioned remotely from the event surface.

14. The system of claim 13, wherein the wind velocity sensor is a Laser Doppler Velocimeter.

15. The system of claim 11, wherein the display is superimposed over a representation of the event surface.

16. The system of claim 11, wherein the display is viewable to a participant in the field event.

17. The system of claim 11, wherein the display is viewable to an observer of the field event.

18. The system of claim 11, wherein the field event is a sports event.

19. The system of claim 11, wherein the sports event comprises at least one of a football game, a baseball game, and golf.

20. The system of claim 11, wherein the field event is a capture of wind energy at a wind energy installation.

* * * * *